(12) United States Patent
Benjamin et al.

(10) Patent No.: US 7,578,874 B2
(45) Date of Patent: Aug. 25, 2009

(54) HOT MELT INKS

(75) Inventors: Ann Benjamin, Keene, NH (US); DeAva Lambert, Coventry, CT (US)

(73) Assignee: Markem Corporation, Keene, NH (US)

( * ) Notice: Subject to any disclaimer, the term of this patent is extended or adjusted under 35 U.S.C. 154(b) by 221 days.

(21) Appl. No.: 10/498,103

(22) PCT Filed: Nov. 21, 2002

(86) PCT No.: PCT/US02/37446

§ 371 (c)(1), (2), (4) Date: Dec. 27, 2004

(87) PCT Pub. No.: WO03/048260

PCT Pub. Date: Jun. 12, 2003

(65) Prior Publication Data

US 2005/0158434 A1     Jul. 21, 2005

Related U.S. Application Data

(63) Continuation of application No. 10/005,015, filed on Dec. 4, 2001, now abandoned.

(51) Int. Cl.
C09D 11/02 (2006.01)
(52) U.S. Cl. .................. 106/31.29; 106/31.61
(58) Field of Classification Search .............. 106/31.29, 106/31.61
See application file for complete search history.

(56) References Cited

U.S. PATENT DOCUMENTS

| | | |
|---|---|---|
| 4,390,369 A | 6/1983 | Merritt et al. |
| 4,659,383 A | 4/1987 | Lin et al. |
| 5,021,802 A | 6/1991 | Allred |
| 5,350,446 A | 9/1994 | Lin et al. |
| 5,409,715 A | 4/1995 | Meyers |
| 5,665,439 A | 9/1997 | Andersen et al. |
| 5,938,826 A | 8/1999 | Baker et al. |
| 5,997,136 A | 12/1999 | Fujisawa et al. |
| 6,013,122 A | 1/2000 | Klitzman et al. |
| 6,093,239 A | 7/2000 | Baker et al. |
| 6,113,678 A | 9/2000 | Malhotra |
| 6,245,135 B1 | 6/2001 | Jaeger et al. |

FOREIGN PATENT DOCUMENTS

| | | |
|---|---|---|
| EP | 0 181 198 | 5/1986 |
| EP | 0 571 451 B1 | 2/1992 |
| EP | 0 796 902 | 9/1997 |
| GB | 1441446 A | 6/1976 |

(Continued)

OTHER PUBLICATIONS

International Preliminary Examination Report, PCT/US02/37446, mailed Mar. 25, 2004.

(Continued)

*Primary Examiner*—Jerry Lorengo
*Assistant Examiner*—Veronica Faison Gee
(74) *Attorney, Agent, or Firm*—Fish & Richardson P.C.

(57) ABSTRACT

A method for forming a mark on a food product is disclosed. The method includes: (a) heating an edible hot melt ink including a colorant to a temperature sufficient to liquify the ink; and (b) transferring the ink to a substrate to provide a mark on the food product.

39 Claims, 1 Drawing Sheet

| | FOREIGN PATENT DOCUMENTS | |
|---|---|---|
| JP | 58005285 | 1/1983 |
| JP | 63063363 | 3/1988 |
| JP | 2001011355 | 1/2001 |
| WO | WO 92/14795 | 9/1992 |
| WO | WO00/49097 | 8/2000 |
| WO | WO 01/94116 | 12/2001 |
| WO | WO02/085995 A | 10/2002 |
| WO | WO 2006/023615 A1 | 3/2006 |

OTHER PUBLICATIONS

International Search Report for PCT/US02/37466, Feb. 10, 2003 (3 pages).

European Search Report for European Patent Application No. 07024129.4 dated Feb. 26, 2008 (5 pages).

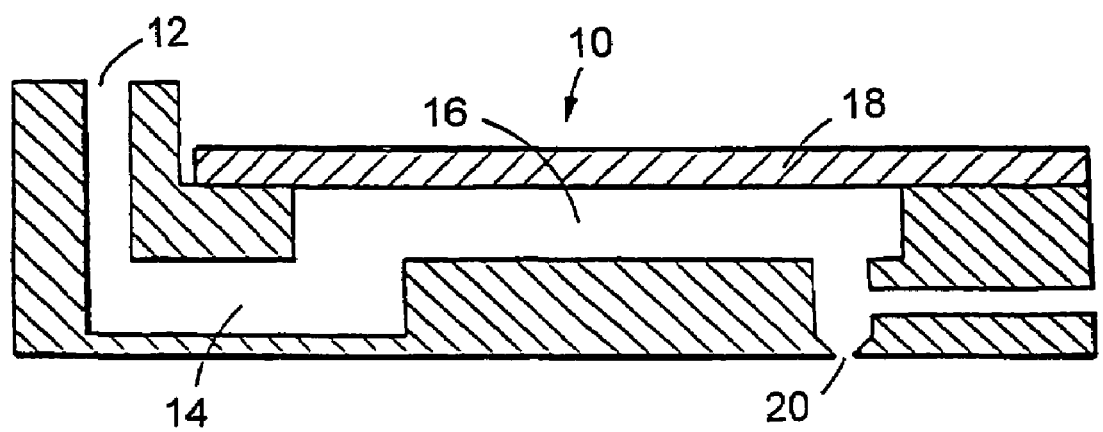
FIGURE

HOT MELT INKS

CROSS-REFERENCE TO RELATED APPLICATIONS

This application is the National Stage of International Application No. PCT/US02/37446, filed on Nov. 21, 2002, which claims priority to U.S. patent application Ser. No. 10/005,015, filed on Dec. 4, 2001, now abandoned. The contents of these applications are incorporated herein by reference in their entirety.

BACKGROUND

This invention relates to hot melt inks.

Hot melt inks are solid at room temperature and liquid at temperatures above room temperature. Hot melt inks can be used, for example, in digital to print methods. During printing, the ink is heated until it becomes liquid, and is then ejected through a printhead onto a substrate. The ink then solidifies on the substrate.

Hot melt inks have been be used, for example, on food packaging. However, it is sometimes desirable to mark directly onto various food products, such as eggs and cheese. Marking directly onto foods allows for additional product identification, as well as the only available identification in cases where the product is sold with little to no packaging, or in cases where the product is not packaged until the point of sale.

The conventional methods for printing directly onto food products include applying liquid inks through stamping, flexography, gravure printing, or continuous ink jet printing technologies. Stamping, flexography, and gravure printing are not digital to print, and can sometimes result in poor print quality. Continuous ink jet printing can result in a mark with low resolution.

SUMMARY

The invention is directed to hot melt inks that are formulated using edible components. Because the inks are made with edible ingredients, the inks may be used to print directly onto food products such as eggs, fruit, cheese, and confectioneries in compliance with the Federal Food, Drug, and Cosmetic Act, and all other applicable food additive regulations. In addition, because the inks are approved as direct food additives, they are automatically approved for indirect food contact. For example, the inks can be used to print on spice sachets that are included in packaged rice and pasta products. The inks can also be used to print on non-food products such as feminine hygiene product wrappers and hygiene wipes.

Because the inks are hot melt inks, they can be used in digital to print methods, resulting in higher resolution and improved print quality compared to other print methods, such as continuous ink jet printing methods. The inks have a number of properties that make them suitable for use on food products. For example, as discussed herein, the inks are edible. In addition, the inks may be formulated such that they can adhere to the irregular surfaces of some food products, e.g., oranges; the inks can also adhere to the moist surfaces of other food products. The inks are formulated such that marks made with the inks can remain legible, even after being subjected to the conditions, e.g., refrigeration or freezing, under which many foods are stored.

In one aspect, the invention features a method for forming a mark on a food product; the method includes: (a) heating an edible hot melt ink including a colorant to a temperature sufficient to liquify the ink; and (b) transferring the ink to a substrate to provide a mark on the food product. The ink can also include a wax and/or a resin. The mark can cover less than 90% of the surface of the food product; less than 75% of the surface of the food product; less than 50% of the surface of the food product; or less than 25% of the surface of the food product.

In another aspect, the invention features a method for forming a mark on a food product; the method includes: (a) heating a hot melt ink including an edible colorant to a temperature sufficient to liquify the ink; and (b) transferring the ink to a substrate to provide a mark on the food product. The resolution of the mark can be at least 50 DPI or at least 75 DPI. The melting temperature of the ink can be less than 100° C.; less than 80° C.; less than 60° C.; or less than 50° C.

In another aspect, the invention features a composition including a food product (e.g., an egg, cheese, fruit, or a confectionary); at least a portion of the food product is marked with a hot melt ink. The ink includes a colorant and consists essentially of edible components. The ink may include a wax.

In another aspect, the invention features a composition including a food product; the food product has a mark formed from a hot melt ink that includes an edible colorant. The melting temperature of the ink can be less than 100° C.; less than 80° C.; less than 60° C.; or less than 50° C. The resolution of the mark can be at least 50 DPI or at least 75 DPI.

In yet another aspect, the invention features a hot melt ink including: (a) a wax selected from the group consisting of carnauba wax and beeswax; and (b) a colorant, wherein the ink consists essentially of edible components. The ink can include a resin, e.g., a hydrogenated rosin ester resin. The ink can also include an antioxidant. In addition, the ink can contain about 50% to about 99% by weight wax; about 55% to about 75% by weight wax; or about 30% to about 50% by weight resin.

In another aspect, the invention features a method for forming a mark on a food product. The method includes: (a) heating a hot melt ink containing a colorant to a temperature sufficient to liquify the ink; and (b) transferring the ink to a substrate to provide a mark on the food product. The ink consists essentially of edible components.

By "edible" in reference to a component is meant that the component is listed as a Generally Recognized as Safe direct food additive (GRAS) in section 21 of the Code of Federal Regulations or is EAFUS-listed, i.e., included on the on the Food and Drug Administration's list of "everything added to food in the United States." An "edible ink" is an ink that contains less than 100 ppm by weight of any impurities, i.e., any components that are not listed as GRAS or are not EAFUS-listed.

By "mark" is meant a legible impression, e.g., a series of letters, numbers, and/or symbols, on a substrate. An example of a mark that is often made on food products is a "Sell by" date.

The details of one or more embodiments of the invention are set forth in the accompanying drawings and the description below. Other features, objects, and advantages of the invention will be apparent from the description and drawings, and from the claims.

DESCRIPTION OF DRAWING

The FIGURE is a side sectional view of an ink jet printhead.

DETAILED DESCRIPTION

A preferred ink is a hot melt ink that is composed primarily of edible materials. An ink that is composed essentially of edible ingredients will itself be, by definition, edible. Therefore, the ink may be used to form marks directly on food products, and the food products so marked will remain edible.

The ink may include a wax. The wax provides the ink with the property of being solid at room temperature, but liquid at elevated temperatures. The ink can melt between 40° C. and 100° C., and preferably melts between 40° C. and 60° C. Thus, the ink melts at a temperature that is low enough to avoid cooking or damaging the food substrate when the ink is applied.

The ink should contain enough wax that the ink, as a whole, is a hot melt material. The ink may also contain combinations of waxes. The ink preferably contains about 50% to about 99% by weight wax, and more preferably contains about 55% to about 75% by weight wax.

Examples of waxes include: stearic acid; succinic acid; beeswax; candelilla wax; carnauba wax; alkylene oxide adducts of alkyl alcohols; phosphate esters of alkyl alcohols; alpha alkyl omega hydroxy poly (oxyethylene); allyl nonanoate; allyl octanoate; allyl sorbate; allyl tiglate; rice bran wax; paraffin wax; microcrystalline wax; synthetic paraffin wax; synthetic paraffin and succinic derivatives; petroleum wax; synthetic petroleum wax; cocoa butter, diacetyl tartaric acid esters of mono and diglycerides; mono and diglycerides; alpha butyl omega hydroxypoly(oxyethylene)poly(oxypropylene); calcium pantothenate; fatty acids; organic esters of fatty acids; calcium salts of fatty acids; mono & diesters of fatty acids; sucrose fatty acid esters; calcium stearoly-2-lactylate; Japan wax; lanolin; glyceryl hydroxydecanoate; glyceryl hydroxydodecanoate; oxidatively refined montan wax fatty acids; polyhydric alcohol diesters; oleic acids; palmitic acid; d-pantothenamide; polyethylene glycol (400) dioleate; polyethylene glycol (MW 200-9,500); polyethylene (MW 200-21,000); oxidized polyethylene; polyglycerol esters of fatty acids; polyglyceryl phthalate ester of coconut oil fatty acids; shellac wax; hydroxylated soybean oil fatty acids; stearyl alcohol; and tallow and its derivatives.

Preferred waxes include #1 Yellow Carnauba wax and White Beeswax, both available from Koster Keunen.

The ink may include a resin. The resin provides the ink with a desired viscosity, thermal stability, flexibility, and adhesion properties. The ink should include enough resin to achieve the desired viscosity, stability, flexibility, and adhesion. Preferably, the ink contains about 0% to about 50% by weight resin, and more preferably contains about 30% to about 50% by weight resin.

Examples of resins include acacia (gum arabic); gum ghatti; guar gum; locust (carob) bean gum; karaya gum (sterculia gum); gum tragacanth; chicle; highly stabilized rosin ester; tall oil; manila copais; corn gluten; coumarone-indene resins; crown gum; damar gum; p, alpha-dimethylstyrene; gum elemi; ethylene oxide polymer and its adducts; ethylene oxide/propylene oxide copolymer and its adducts; galbanum resin; gellan gum; ghatti gum; gluten gum; gualac gum; guarana gum; heptyl paraben; cellulose resins, including methyl and hydroxypropyl; hydroxypropyl methylcellulose resins; isobutylene-isoprene copolymer; mastic gum; oat gum; opopanax gum; polyacrylamide; modified polyacrylamide resin; polylimonene; polyisobutylene (min. MW 37,000); polymaleic acid; polyoxyethylene derivatives; polypropylene glycol (MW 1200-3000); polyvinyl acetate; polyvinyl alcohol; polyvinyl polypyrrolidone; polyvinyl pyrrolidone; rosin, adduct with fumaric acid, pentaerythritol ester; rosin, gum, glycerol ester; rosin, gum or wood, pentaerythritol ester; rosin, gum or wood, partially hydrogenated, glycerol ester; rosin, gum or wood, partially hydrogenated, pentaerythritol ester; rosin, methyl ester, partially hydrogenated; rosin, partially dimerized, glycerol ester; rosin, partially hydrogenated; rosin and rosin derivatives; rosin, polymerized, glycerol ester; rosin, tall oil, glycerol ester; rosin, wood; rosin, wood, glycerol ester; purified shellac; styrene; styrene terpolymers; styrene copolymers; sucrose acetate isobutyrate; terpene resins, natural and synthetic; turpentine gum; vinylacetate; vinyl chloride-vinylidene chloride copolymer; zanthan gum; and zein.

A preferred resin is Foral 85 hydrogenated rosin ester resin, available from Hercules.

The ink may include a colorant or dye, which provides color to the ink. If an ink is to be used on a white or light-colored food product, it is desirable for the ink to have a dark color, for better legibility of the mark. If an ink is to be used on a dark-colored food product, it may not be necessary to include a colorant in the ink. The ink preferably contains a sufficient amount of the colorant that the ink has color, but not so much as to interfere with other desirable qualities, such as hot melt qualities or viscosity. Preferred inks contain about 0.1% to about 20% by weight colorant, and more preferably contain about 1% to about 10% by weight colorant.

Examples of colorants include beta carotene; b-apo-8'-carotenal; canthaxanthin; astaxanthin; brown algae extract; red algae; red algae extract; allspice oleoresin; FD&C Green no. 3; FD&C Green no. 3, aluminum lake; FD&C Green no. 3, calcium lake; FD&C Blue no. 1; FD&C Blue no. 2; FD&C Blue no. 1, aluminum lake; FD&C Blue no. 2, aluminum lake; FD&C Blue no. 1, calcium lake; FD&C Blue no. 2, calcium lake; FD&C Red no. 40; FD&C Red no. 40, calcium lake; FD&C Yellow no. 6; FD&C Yellow no. 5, aluminum lake; FD&C Yellow no. 5, calcium lake; FD&C Yellow no. 6, aluminum lake; FD&C Yellow no. 6, calcium lake; iron oxide; citrus red no. 2; titanium dioxide; turmeric oleoresin; ultramarine blue; carmine; caramel; channel black; FD&C Green no. 3; FD&C Red, no. 3; ED&C Yellow, no. 6; Ponceau 4R; quinoline yellow; patent blue V; Green S; Brown HT; brilliant black BN; carmoisine; amaranth; erythrosine late; amaranth lake; Ponceau 4R lake; and carmoisine lake. A preferred colorant is Apocarotenal.

The ink may include a stabilizer, which inhibits oxidation of the ink components. Sufficient stabilizer should be included to inhibit oxidation, but not so much should be included that the other properties of the ink are adversely affected. The ink preferably includes about 0.1% to about 2% by weight stabilizer, and more preferably contains about 0.5% to about 1% by weight stabilizer.

Examples of stabilizers include butylated hydroxyanisole (BHA); butylated hydoxytoluene (BHT); propyl gallate; tert-butyl hydroquinone (TBHQ); ethylenediaminetetraacetic acid (EDTA); methyl paraben; propyl paraben; benzoic acid. A preferred stabilizer is Tenox BHA, available from Eastman Chemical.

The ink may include a dispersant and/or a surface tension modifier. A sufficient quantity of these optional ingredients may be included in the ink to provide the desired property, e.g., the desired surface tension. The ink preferably includes about 0.5% to about 5% by weight dispersant or surface tension modifier, and more preferably contains about 0.2% to about 1% by weight dispersant or surface tension modifier. An example of a dispersant and/or surface tension modifier is lecithin.

Additionally, the ink may include other conventional hot melt ink ingredients such as oils, flexibilizers, plasticizers, and other additives. Oils, flexibilizers, and plasticizers can reduce the viscosity of the inks. A sufficient quantity of these optional ingredients may be included in the ink to provide the desired viscosity.

Examples of oils, flexibilizers and plasticizers include glycerin; lecithin and modified lecithins; agar-agar; dextrin; diacetyl; enzyme modified fats; glucono delta-lactone; carrot oil; chincona extract; rapeseed oil; pectins; propylene glycol; peanut oil; sorbitol; acetophenone; brominated vegetable oil; polyoxyethylene 60 sorbitan mono stearate; olestra; castor oil; oiticia oil; 1,3 butylene glycol; coconut oil and its derivatives; corn oil; substituted benzoates; substituted butyrates; substituted citrates; substituted formates; substituted hexanoates; substituted isovalerates; substituted lactates; substituted propionates; substituted isobutyrates; substituted octanoates; substituted palmitates; substituted myristates; substituted oleates; substituted stearates, distearates and tristearates; substituted gluconates; substituted undecanoates; substituted behenates; substituted succinates; substituted gallates; substituted heptanoates; substituted phenylacetates; substituted cinnamates; substituted 2-methylbutyrates; substituted tiglates; corn syrup; isoparaffinic petroleum hydrocarbons; mineral oil; glycerin; mono- and diglycerides and their derivatives; olibanum oil; opopanax oil; peanut oil; polysorbates 20, 60, 65, 80; propylene glycol mono- and diesters of fats and fatty acids; epoxidized soybean oil; hydrogenated soybean oil; sperm oil; and hydrogenated sperm oil.

The inks generally are prepared by combining all of the ink ingredients except for the colorant; heating the resulting combination to a temperature above its melting point; and slowly stirring until the liquified combination is homogeneous. If a colorant is to be included, it is then added to the mixture with stirring, or dispersed into the molten materials. The molten ink is filtered to remove particles larger than 1 μm in size.

The preferred inks can be used with a conventional hot melt ink jet printer. Referring to the FIGURE, the printhead 10 of this printer includes a fill port 12, a membrane cavity 14, a pumping chamber 16, a PZT (piezoelectric transducer) 18, and an orifice 20. The ink is placed in the printhead through the fill port 12; the ink then passes through the membrane cavity 14, where is it degassed. The ink then flows into the pumping chamber 16. The printhead 10 is heated, so the ink is melted to a liquid state prior to being ejected from the ink jet printhead. The liquid ink is ejected by activation of the PZT 18. This printer is known as a drop on demand printer since a droplet of ink is ejected each time the PZT material is activated. Drop on demand printers are described in more detail in U.S. Pat. No. 5,265,315, which is hereby incorporated by reference in its entirety. An example of a printer that can be used is the Markem 9096 printer, which has 96 ink jet orifices and a resolution of 96 DPI. In the 9096 printer, actuation of the PZT element associated with each orifice is digitally controlled.

During printing, as a substrate passes by the orifices 20, droplets of the hot, liquid ink are ejected through the orifices. Upon contacting the substrate, which is typically at room temperature or below room temperature, the liquid ink cools and solidifies.

The inks may be used to form marks on foods, or on other substrates. For example, the inks may be used to form marks on cheese, eggs, confectioneries, etc. The ink to be used will depend on the adhesion, abrasion resistance, and packaging requirements of the food or non-food product.

The preferred inks do not render the food products marked with the inks inedible. In other words, compositions containing a food product and a preferred ink are edible. An example of such a composition is a piece of cheese marked with an edible hot melt ink.

The following examples are meant to illustrate the invention, and are not to be construed as limiting the following claims.

EXAMPLE 1

A hot melt ink was prepared that included: 48% by weight #1 Yellow Carnauba wax; 4% by weight White Beeswax; 37.5% by weight Foral 85 hydrogenated rosin ester resin; 0.5% by weight Tenox BHA; and 10% by weight Apocarotenal dispersion 20A.

EXAMPLE 2

A hot melt ink was prepared that included: 48% by weight #1 Yellow Carnauba wax; 4% by weight NF Beeswax; 37.5% by weight Foral 85 hydrogenated rosin ester resin; 0.5% by weight Tenox BHA; and 10% by weight Apocarotenal dispersion 20A.

EXAMPLE 3

A hot melt ink was prepared that included: 52.25% by weight #1 Yellow Carnauba wax; 42.75% by weight Foral 85 hydrogenated rosin ester resin; 5% by weight Apocarotenal dispersion 20A. The viscosity of this ink at 135° C. is 22.4 centipoise.

EXAMPLE 4

A hot melt ink was prepared that included: 42% by weight Foral 85 hydrogenated rosin ester resin; 28% by weight #1 Yellow Carnauba wax; 24% by weight Hercolyn D hydrogenated rosin ester resin; and 6% by weight Apocarotenal dispersion 20A. The viscosity of the ink at 135° C. is 22.4 centipoise.

These inks may be modified in order to change desired properties. For example, Yellow Carnauba Wax is relatively hard, and beeswax is relatively soft. Changing the ratio of carnauba wax to beeswax to alter the flex and adhesion properties of the inks. Alternatively, a relatively hard resin could be replaced by a relatively soft resin to change flex and adhesion properties.

All publications and patents mentioned in this application are herein incorporated by reference to the same extent as if each individual publication or patent was specifically and individually indicated to be incorporated by reference.

A number of embodiments of the invention have been described. Nevertheless, it will be understood that various modifications may be made without departing from the spirit and scope of the invention. Accordingly, other embodiments are within the scope of the following claims.

What is claimed is:

1. A method for forming a mark on a food product, the method comprising:
   (a) heating an edible hot melt ink to a temperature sufficient to liquify the ink, the ink being completely edible and comprising an edible rosin ester resin and an edible colorant; the hot melt ink being thermally stable for ink jet printing; and
   (b) transferring the ink to a food product to provide a mark on the food product.

2. The method of claim 1, wherein the ink further comprises a wax.

3. The method of claim 2, wherein the ink further comprises a resin.

4. The method of claim 1, wherein the mark covers less than 90% of the surface of the food product.

5. The method of claim 1, wherein the mark covers less than 75% of the surface of the food product.

6. The method of claim 1, wherein the mark covers less than 50% of the surface of the food product.

7. The method of claim 1, wherein the mark covers less than 25% of the surface of the food product.

8. The method of claim 1, wherein the resolution of the mark is at least 50 DPI.

9. The method of claim 1, wherein the resolution of the mark is at least 75 DPI.

10. The method of claim 1, wherein the melting temperature of the ink is less than 100° C.

11. The method of claim 1, wherein the melting temperature of the ink is less than 80° C.

12. The method of claim 1, wherein the melting temperature of the ink is less than 60° C.

13. The method of claim 1, wherein the melting temperature of the ink is less than 50° C.

14. A composition of matter comprising a food product, wherein at least a portion of the food product is marked with an edible hot melt ink; the ink being completely edible and comprising an edible rosin ester resin and an edible colorant.

15. The composition of claim 14, wherein the ink further comprises a wax.

16. The composition of claim 14, wherein the food product is an egg.

17. The composition of claim 14, wherein the food product is a cheese.

18. The composition of claim 14, wherein the food product is a fruit.

19. The composition of claim 14, wherein the food product is a confectionery.

20. The composition of claim 14, wherein the melting point of the ink is less than 100° C.

21. The composition of claim 14, wherein the melting point of the ink is less than 80° C.

22. The composition of claim 14, wherein the melting point of the ink is less than 60° C.

23. The composition of claim 14, wherein the melting point of the ink is less than 50° C.

24. The composition of claim 14, wherein the resolution of the mark is at least 50 DPI.

25. The composition of claim 14, wherein the resolution of the mark is at least 75 DPI.

26. An edible hot melt ink comprising:
  (a) a wax selected from the group consisting of carnauba wax and beeswax; and
  (b) an edible colorant, wherein the ink consists essentially of completely edible components.

27. The ink of claim 26, wherein the wax is carnauba wax.

28. The ink of claim 26, wherein the wax is beeswax.

29. The ink of claim 26, wherein the ink further comprises a resin.

30. The ink of claim 29, wherein the resin is a hydrogenated rosin ester resin.

31. The ink of claim 26, wherein the ink further comprises an antioxidant.

32. The ink of claim 26, wherein the ink contains about 50% to about 99% by weight wax.

33. The ink of claim 32, wherein the ink contains about 55% to about 75% by weight wax.

34. The ink of claim 32, wherein the ink contains about 30% to about 50% by weight resin.

35. A method for forming a mark on a food product, the method comprising:
  (a) heating a hot melt ink a temperature sufficient to liquify the ink, the ink being completely edible and comprising an edible rosin ester resin and an edible colorant; the hot melt ink being thermally stable for ink jet printing; and
  (b) transferring the ink to a food product to provide a mark on the food product.

36. A method comprising:
  (a) heating an edible hot melt ink to a temperature sufficient to liquify the ink, the ink being completely edible and comprising an edible rosin ester resin and an edible colorant the hot melt ink being thermally stable for ink jet printing;
  (b) transferring the ink to a substrate to provide a mark on the substrate; and
  (c) consuming the ink.

37. An edible hot melt ink comprising a wax selected from the group consisting of: succinic acid; beeswax; alkylene oxide adducts of alkyl alcohols; phosphate esters of alkyl alcohols; alpha alkyl omega hydroxy poly (oxyethylene); allyl nonanoate; allyl octanoate; allyl sorbate; allyl tiglate; rice bran wax; synthetic paraffin and succinic derivatives; petroleum wax; synthetic petroleum wax; cocoa butter; diacetyl tartaric acid esters of mono and diglycerides; mono and diglycerides; alpha butyl omega hydroxypoly(oxyethylene)poly(oxypropylene); calcium pantothenate; fatty acids; organic esters of fatty acids; calcium salts of fatty acids; mono & diesters of fatty acids; sucrose fatty acid esters; calcium stearoly-2-lactylate; Japan wax; lanolin; glyceryl hydroxydecanoate; glyceryl hydroxydodecanoate; oxidatively refined montan wax fatty acids; polyhydric alcohol diesters; oleic acids; palmitic acid; d-pantothenamide; polyethylene glycol (400) dioleate; polyglycerol esters of fatty acids; polyglyceryl phthalate ester of coconut oil fatty acids; shellac wax; hydroxylated soybean oil fatty acids; stearyl alcohol; tallow; and tallow derivatives, wherein the ink consists essentially of completely edible components.

38. The hot melt ink of claim 37, wherein the wax comprises beeswax.

39. An edible hot melt ink comprising a resin selected from the group consisting of: acacia; gum ghatti; guar gum; locust bean gum; karaya gum; gum tragacanth; chicle; tall oil; manila copais; corn gluten; coumarone-indene resins; crown gum; damar gum; p, alpha-dimethylstyrene; gum elemi; ethylene oxide polymer and its adducts; ethylene oxide/propylene oxide copolymer and its adducts; galbanum resin; gellan gum; ghatti gum; gluten gum; gualac gum; guarana gum; heptyl paraben; hydroxypropyl methylcellulose resins; isobutylene-isoprene copolymer; mastic gum; oat gum; opopanax gum; polyacrylamide; modified polyacrylamide resin; polylimonene; polyisobutylene; polymaleic acid; polyoxyethylene derivatives; polypropylene glycol; polyvinyl acetate; polyvinyl polypyrrolidone; purified shellac; styrene; sucrose acetate isobutyrate; turpentine gum; vinylacetate; vinyl chloride-vinylidene chloride copolymer; zanthan gum; and zein, wherein the ink consists essentially of completely edible components.

* * * * *

UNITED STATES PATENT AND TRADEMARK OFFICE
CERTIFICATE OF CORRECTION

PATENT NO. : 7,578,874 B2
APPLICATION NO. : 10/498103
DATED : August 25, 2009
INVENTOR(S) : Ann Benjamin and DeAva Lambert It is certified that error appears in the above-identified patent and that said Letters Patent is hereby corrected as shown below:

In Col. 3, line 16, – delete "hydroxyl poly (oxyethylene);" and insert
-- hydroxypoly(oxyethylene); --.

In Col. 3, line 49, – delete "gualac" and insert -- guaiac --.

In Col. 8, Claim 35, line 1, – delete "a" and insert -- to a --.

In Col. 8, Claim 36, line 11, – delete "colorant" and insert -- colorant; --.

In Col. 8, Claim 37, line 19, – delete "hydroxyl poly (oxyethylene);" and insert
-- hydroxypoly(oxyethylene); --.

In Col. 8, Claim 39, line 46, – delete "gualac" and insert -- guaiac --.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,578,874 B2 | Page 1 of 1 |
| APPLICATION NO. | : 10/498103 | |
| DATED | : August 25, 2009 | |
| INVENTOR(S) | : Benjamin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this
Twenty-ninth Day of March, 2011

David J. Kappos
*Director of the United States Patent and Trademark Office*